United States Patent [19]
Aaron

[11] 3,975,853
[45] Aug. 24, 1976

[54] WORM HOLDER

[76] Inventor: James Calvin Aaron, 1172 Church St., Covington, Ga. 30209

[22] Filed: May 12, 1975

[21] Appl. No.: 576,624

[52] U.S. Cl. ........................................ 43/4
[51] Int. Cl.² ................................. A01K 97/00
[58] Field of Search ............................. 43/4

[56] References Cited
UNITED STATES PATENTS

| | | | |
|---|---|---|---|
| 2,518,590 | 8/1950 | Andrist | 43/4 |
| 2,531,551 | 11/1950 | Brecht et al. | 43/4 |
| 2,885,814 | 5/1959 | Schlador | 43/4 |
| 2,929,166 | 3/1960 | Sneide | 43/4 |
| 3,164,067 | 1/1965 | Hurst | 43/4 |

Primary Examiner—Russell R. Kinsey
Assistant Examiner—Daniel J. Leach
Attorney, Agent, or Firm—Jones, Thomas & Askew

[57] ABSTRACT

A worm holder comprising an elongated open-ended flexible transparent tube with a side opening and a slot extending from one end of the tube to the side opening. A plurality of slits are formed radially about the tube to cause the tube to be more compressible adjacent the side opening. A tethered clamp is threaded through the tube, the clamp engages the end portion of a worm, and the clamp and worm are drawn through the tube by the tether until the worm is located in the vicinity of the side opening of the tube, whereupon the worm can be safely and accurately impaled by a fish hook.

5 Claims, 2 Drawing Figures

U.S. Patent  Aug. 24, 1976  3,975,853
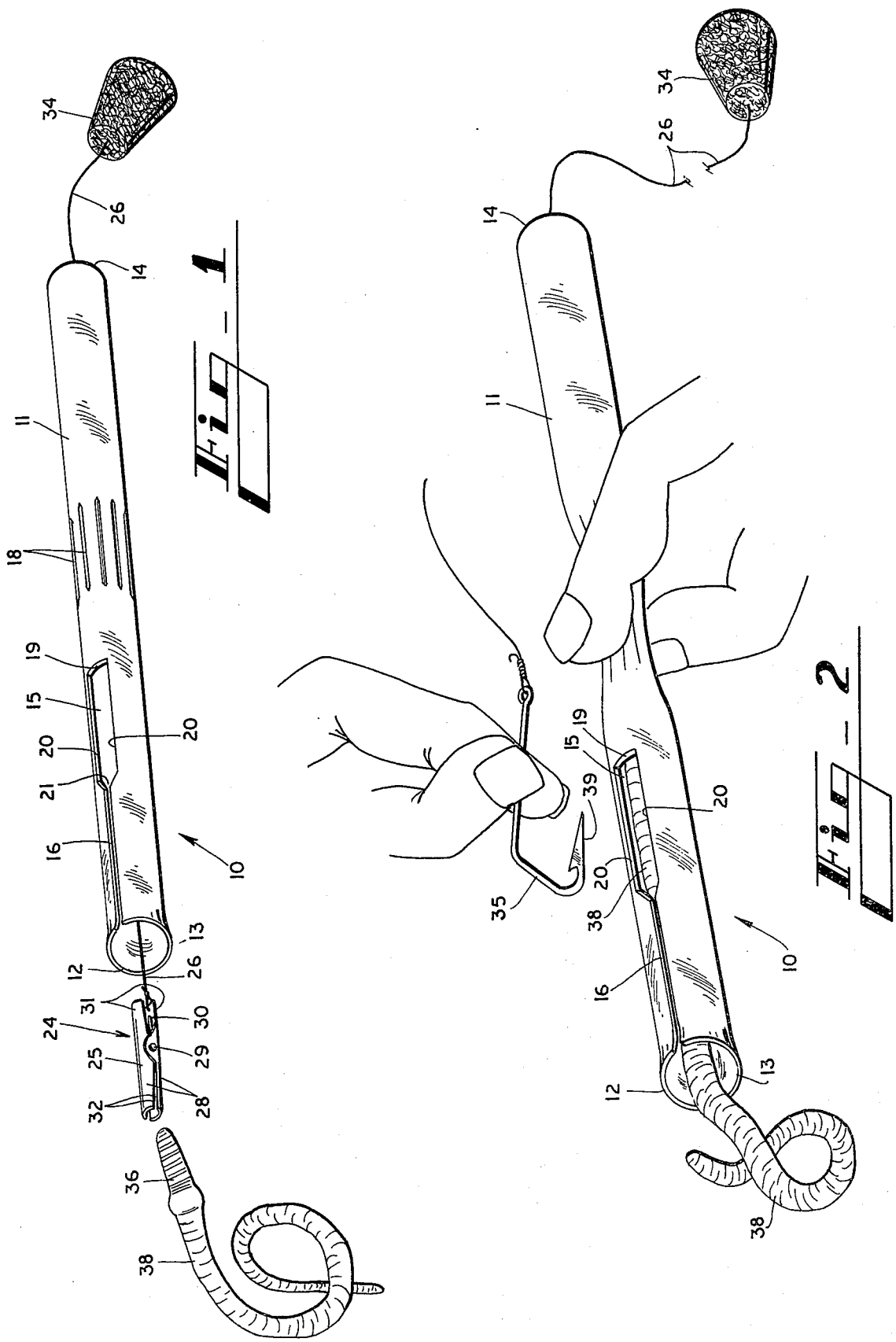

WORM HOLDER

BACKGROUND OF THE INVENTION

When a fisherman puts a worm on his hook, it is desirable to have the hook pass through the center of the worm so that the hook does not tear out of the worm upon casting or drawing the hook through water. Under normal conditions, it is difficult for an experienced fisherman to hold a worm or other moving slippery bait while attempting to pass the barb of a fish hook through the bait, and when the fisherman is an inexperienced fisherman or when weather conditions are poor, the hazard of impaling the fisherman's fingers with the hook is increased.

SUMMARY OF THE INVENTION

Briefly described, the present invention comprises a worm holder which provides a safe and expedient means for attaching worms and similar bait to a fish hook. The worm holder comprises an open-ended transparent flexible tube with a side opening and a slot extending from one end of the tube to the side opening. A spring-closed tethered clamp passes through the tube, and the fisherman merely presses the clamp open and extends the gripping end of the clamp into a supply of worms to grasp a worm, and then pulls the tether through the tube to move the clamp and one end of the worm into the tube. While the worm is in the tube, it is held securely in place while the fisherman passes the barb of a fish hook through the side opening of the tube and into the worm to safely and accurately impale the worm with a barb.

Thus, it is an object of the present invention to provide a worm holder that maintains a worm or the like in a relatively static position so that a fish hook barb can be passed accurately into the worm for purposes of baiting the hook.

Another object of the present invention is to provide an inexpensive and convenient apparatus for expediently, accurately and safely applying a worm to a fish hook.

Other objects, features and advantages of the present invention will become apparent upon reading the following specification, when taken in conjunction with the accompanying drawing.

BRIEF DESCRIPTION OF THE DRAWING

FIG. 1 is a perspective view of the worm holder with the tethered clamp extending therethrough and with a worm shown in spaced relationship therewith.

FIG. 2 is a perspective illustration, similar to FIG. 1, but showing the manner in which the worm holder is handled by the hands of the fisherman with the worm positioned in the worm holder.

DESCRIPTION OF AN EMBODIMENT

Referring now in more detail to the drawing, in which like numerals indicate like parts throughout the several views, FIG. 1 illustrates the worm holder 10 which includes a tube member comprising an open ended transparent flexible tube 11 defining an elongated central opening 13. The tube illustrated herein is fabricated from polyvinyl chloride; however, the tube can be fabricated from other flexible transparent materials. The open end 12 of the tube is flared outwardly to form an enlarged open end, while the opposite open end 14 is of approximately the same diameter as the body portion of the tube. A side opening 15 intersects the elongated central opening 13 and is located intermediate the ends of the tube, and slot 16 extends from side opening 15 through the enlarged open end 12 of the tube. A plurality of slits 18 are formed in the central body portion of the tube adjacent the open end 14 and away from the slot 16, with the slits 18 extending along the length of the tube and being spaced about the circumference of the tube and causing the portion of the tube at the slits to be more flexible and more compressible. The side opening 15 has a relatively flat end edge 19, side edges 20, and a V-shaped tapered end edge 21 that is intersected by slot 16.

Tethered clamp 24 includes clamp 25 and tether or drawstring 26. Clamp 25 includes a pair of clamp plates 28 connected together by pivot pin 29. A spring 30 is coiled about pivot pin 29 and its ends extend into the handle protrusions 31 of the clamp so as to urge the handle protrusions apart and urge the gripping protrusions 32 toward each other into a spring closed grasping position. The tether 26 is tied to the pivot pin 29 and is of a sufficient length to pass through and beyond tube 11. A retaining member 34 such as a plastic washer, a fisherman's weight or buoyant cork is attached to the tether 26 at its end remote from clamp 25, and the thickness of the retaining member 34 is larger than the inside diameter of tube 11, so that the retaining member will not pass through the tube.

When the fisherman wishes to impale a worm with a fish hook 35, the clamp 25 is passed through the tube 11 and out of the enlarged open end 12 as illustrated in FIG. 1, the finger protrusions 31 of the clamp are pressed together to open the opposite gripping protrusions 32 which are placed about the end portion 36 of a worm 38. When the clamp is released, it securely grasps the end of the worm and the retaining member 34 and draw string 26 are pulled with respect to the tube 11, which results in the clamp 25 moving through tube 11 and pulling the worm at least partially into the tube as illustrated in FIG. 2. The enlarged open end 13 of the tube guides the clamp 25 and worm into the tube.

When the worm is located so that its relatively thick, tough tissue is positioned in the vicinity of side opening 15, the fisherman presses the tube 11 in the vicinity of the slits 18 so as to partially collapse the tube and grip the portion of the worm in this vicinity. This stabilizes the position of the worm in the tube. The fisherman then manipulates the hook 35 so that its barb 39 passes through the side opening 15 of the tube and impales the worm 38. The tube 11 functions to prevent the worm from moving laterally with respect to the hook during the hooking procedure, and the compression of the tube at the slits 18 keeps the worm from moving longitudinally through the tube. The fisherman can manipulate the tube and the hook with respect to each other so as to accurately and securely pass the barb properly through the worm.

When the worm has been properly impaled by the hook and the fisherman desires to remove the hook and the worm from the tube, the fisherman moves the hook 35 along the length of the tube 11 from the side opening 15 through the slot 16 until the hook 35 and worm 38 pass through the open end 12 of the tube. The clamp 25 will move with the worm as the worm and hook are withdrawn from the tube.

If a long worm is being handled by the worm holder, the fisherman may decide to use only a fraction of the worm for his bait. When the fisherman has impaled the worm with the hook, he might use the relatively flat end edge 19 as a cutting surface, by squeezing the slits 18 with one hand and pulling the hook 35 out of the side opening 15, causing the worm to be cut in two pieces by the flat edge 19. The portion of the worm remaining on the hook 35 can then be moved with the hook 35 back into the side opening 15 and along the length of the tube toward the open end 12 as the hook 35 moves through the slot 16.

While this invention has been described in detail with particular reference to preferred embodiments thereof, it will be understood that variations and modifications can be effected within the spirit and scope of the invention as described hereinbefore and as defined in the appended claims.

I claim:

1. A bait holder for use in impaling a worm or the like with a fish hook comprising an open ended transparent tubular member defining a side opening intermediate its ends, a slot formed in said tubular member extending longitudinally from one open end of said tubular member to said side opening, a plurality of slits formed in said tubular member adjacent the end of the tubular member opposite from the slotted end, and a tethered clamp member threaded through said tubular member for clamping a worm and pulling the worm partially through said tubular member to position the worm in the vicinity of the side opening where the worm is exposed for impalement by a fish hook.

2. A bait holder comprising an open-ended tube, a side opening formed in said tube, a slot formed in said tube and extending from one end of said tube to said side opening, and a tethered clamp for clamping onto a worm and drawing the worm into the tube.

3. The bait holder of claim 2 and wherein said tube is flexible and transparent.

4. The bait holder of claim 2 and wherein the end of said tube which includes the slot is flared outwardly to form an enlarged open end.

5. A bait holder comprising an open ended tube, a side opening formed in said tube, a slot formed in said tube and extending from one end of said tube to said side opening, and a plurality of slits formed in said tube adjacent the end of the tube opposite to the end having the slot.

* * * * *